Figure 5:
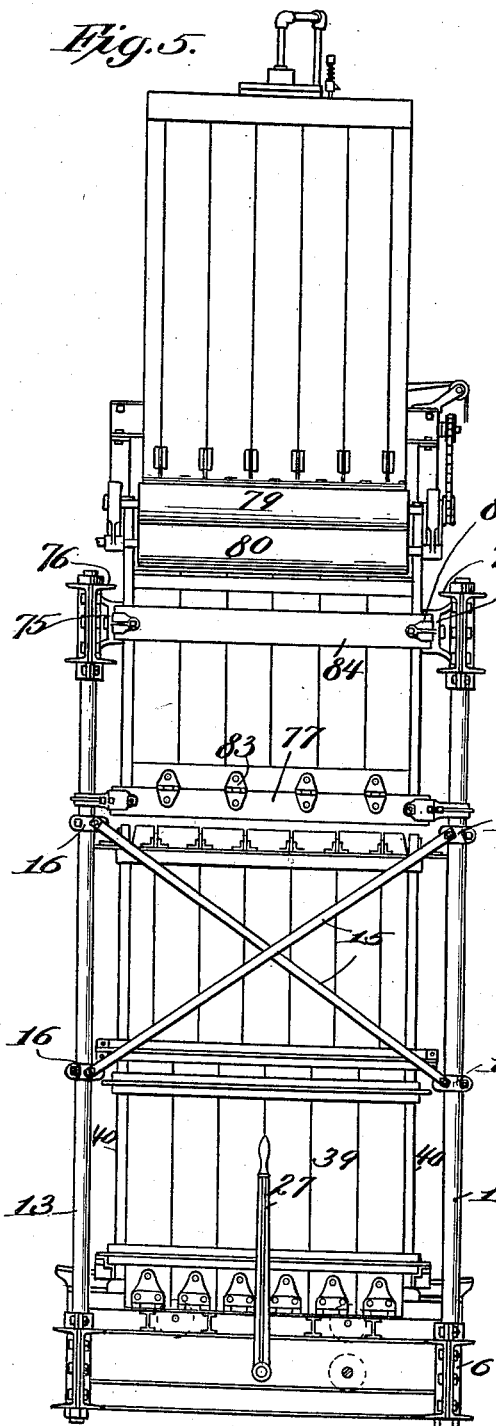

S. D. MURRAY.
BALING PRESS.
APPLICATION FILED FEB. 10, 1911.
1,074,642.
Patented Oct. 7, 1913.
7 SHEETS—SHEET 1.
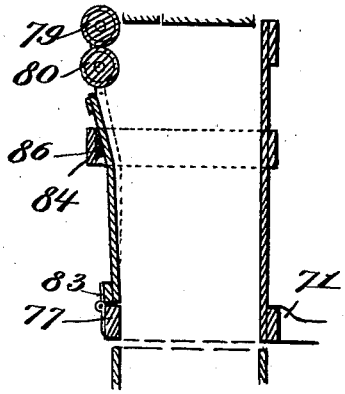
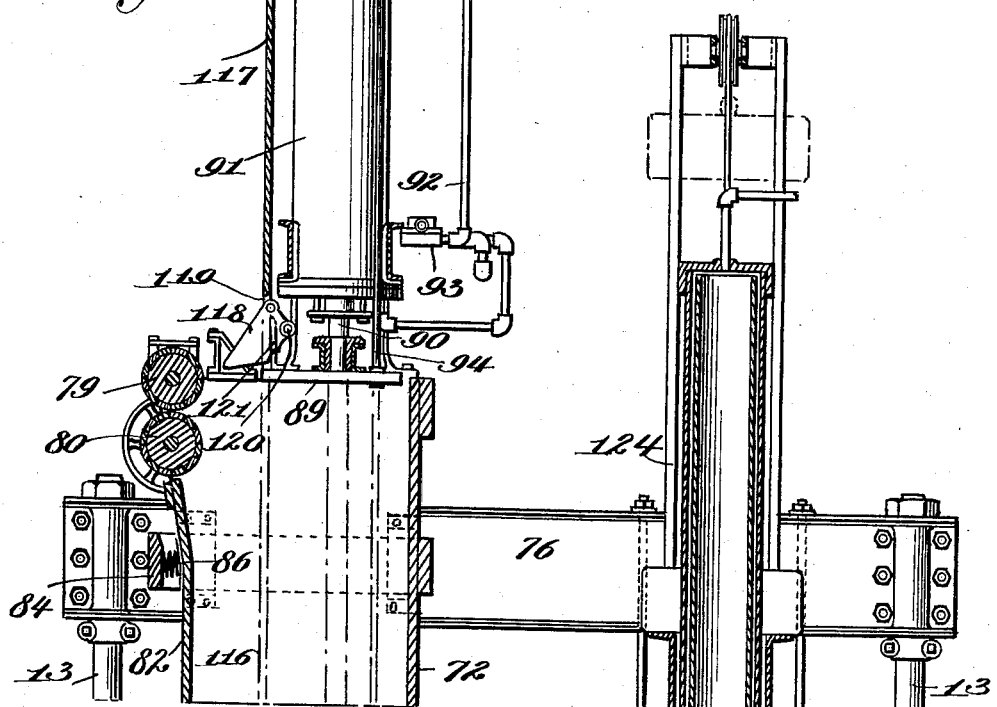
Witnesses,
Inventor,
Stephen D. Murray,
By
Atty.

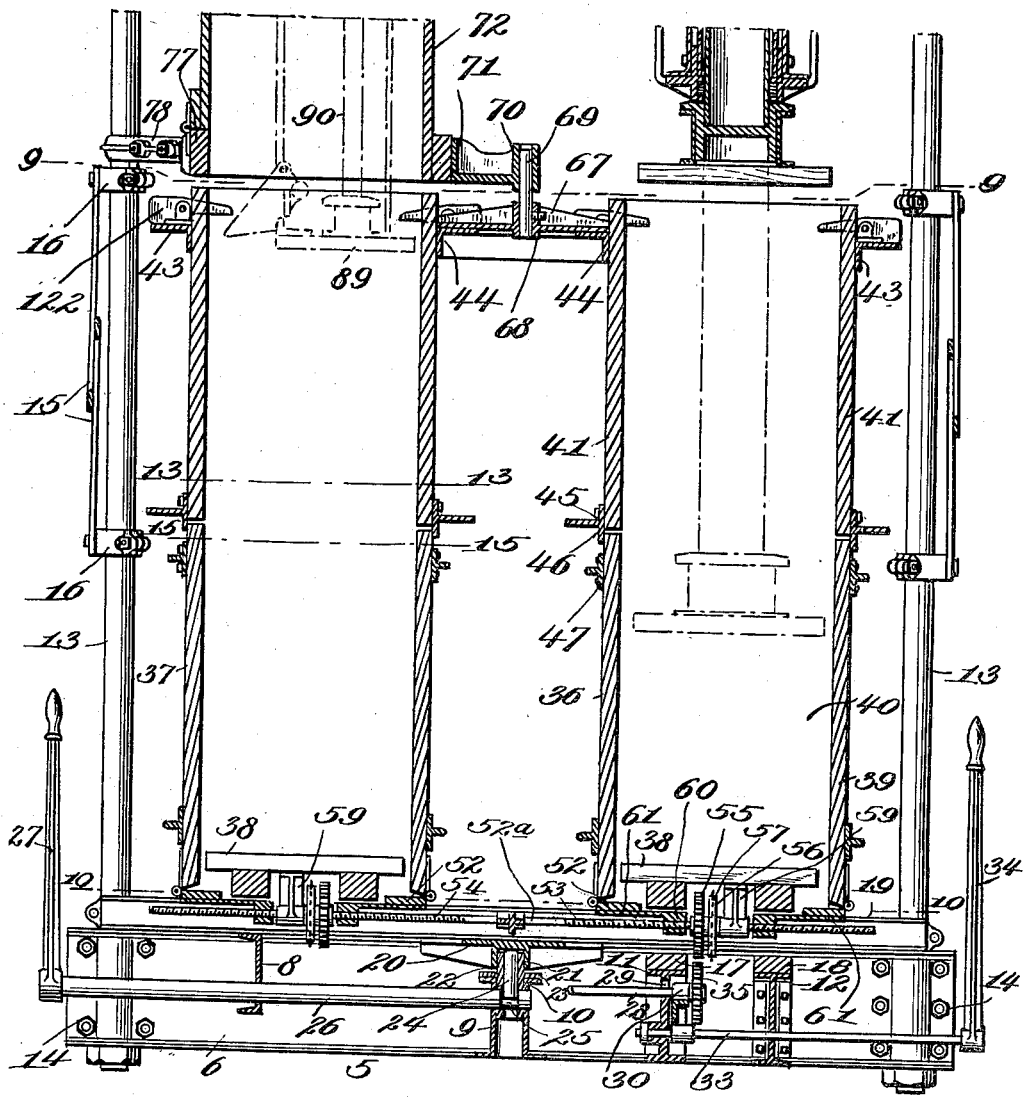

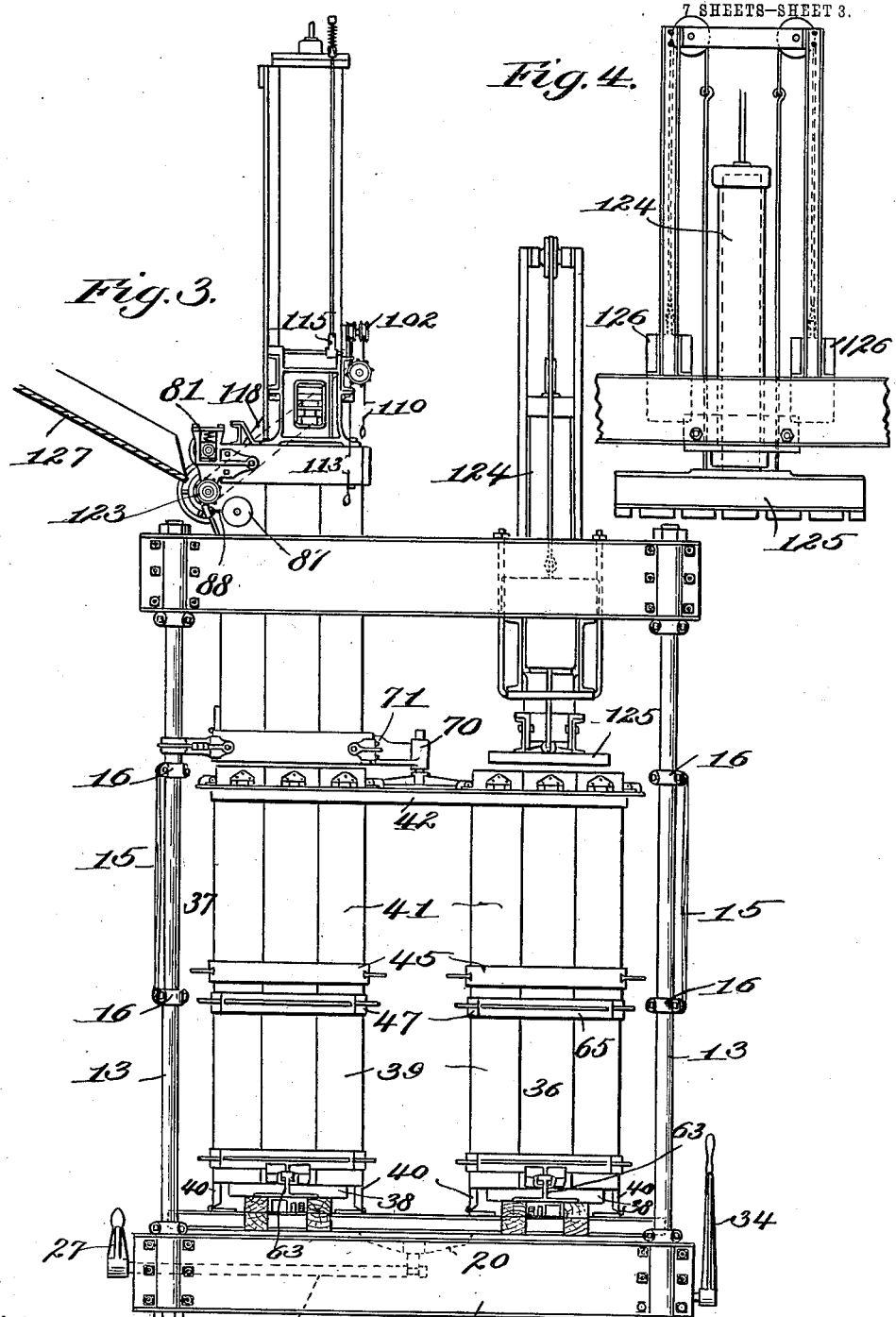

S. D. MURRAY.
BALING PRESS.
APPLICATION FILED FEB. 10, 1911.

1,074,642. Patented Oct. 7, 1913.
7 SHEETS—SHEET 4.

Inventor
Stephen D. Murray

S. D. MURRAY.
BALING PRESS.
APPLICATION FILED FEB. 10, 1911.

1,074,642.

Patented Oct. 7, 1913.

7 SHEETS—SHEET 5.

Witnesses:

Inventor
Stephen D. Murray
by
Atty.

S. D. MURRAY.
BALING PRESS.
APPLICATION FILED FEB. 10, 1911.
1,074,642.
Patented Oct. 7, 1913.
7 SHEETS—SHEET 6.
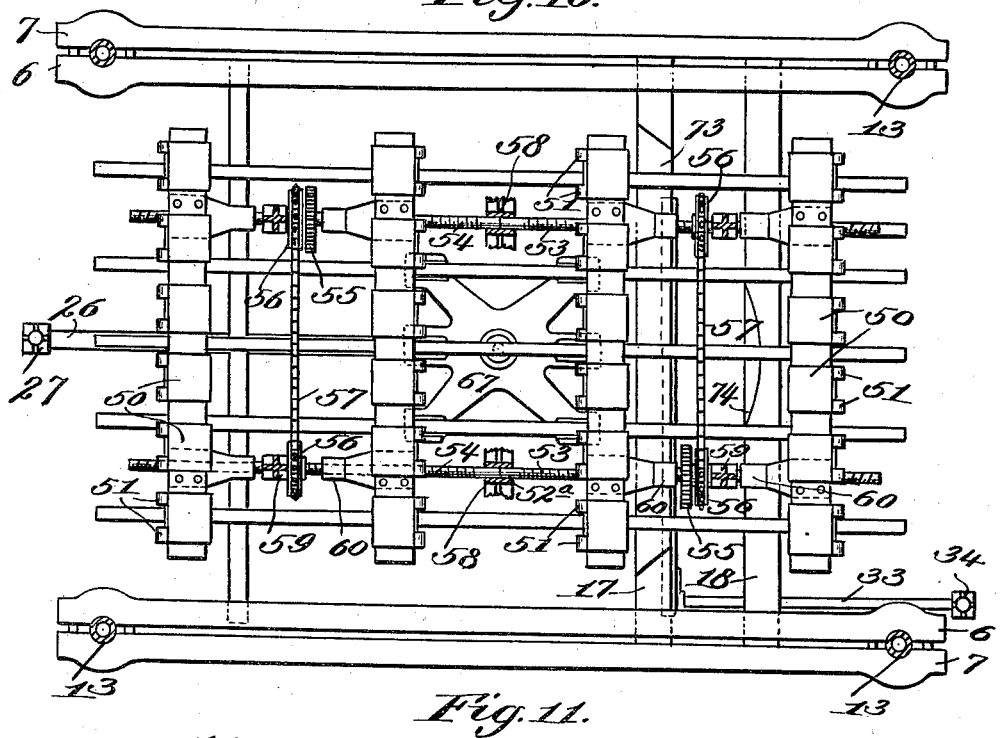
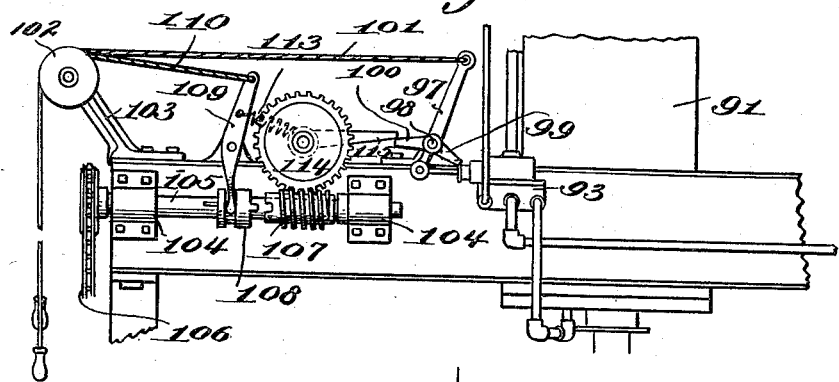
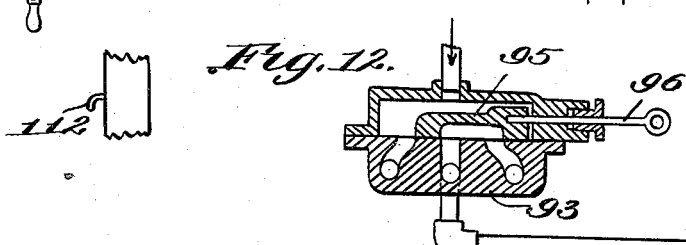
Witnesses:
Inventor
Stephen D. Murray S. D. MURRAY.
BALING PRESS.
APPLICATION FILED FEB. 10, 1911.
1,074,642.
Patented Oct. 7, 1913.
7 SHEETS—SHEET 7.
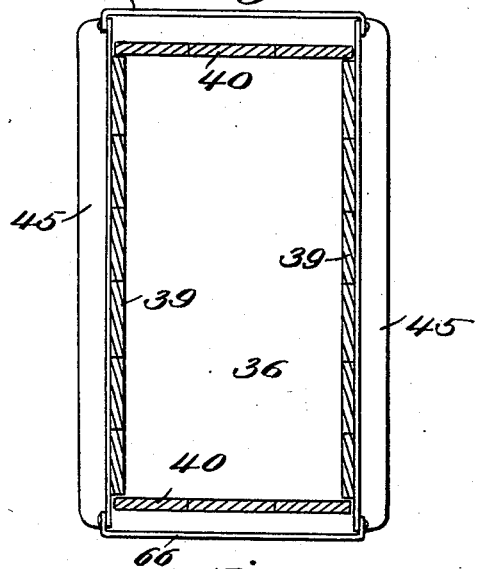
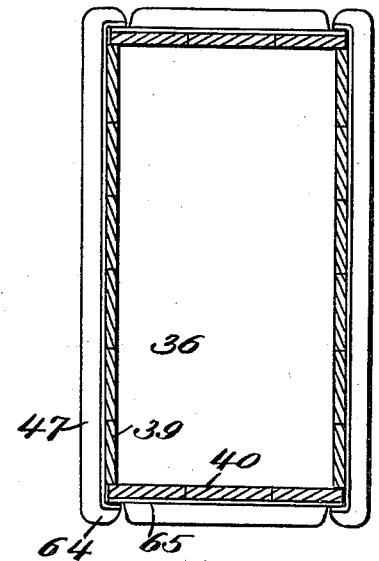
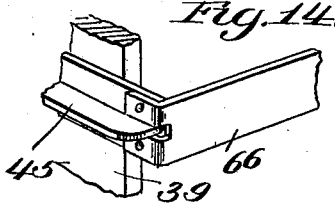
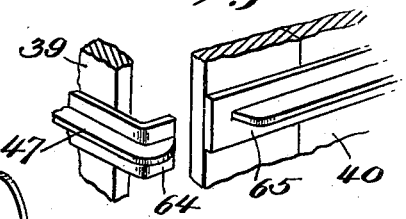
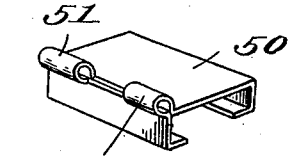
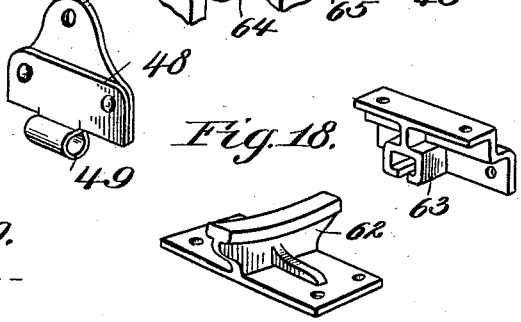
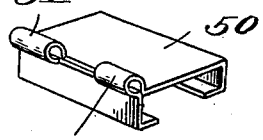
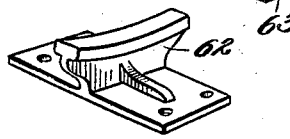
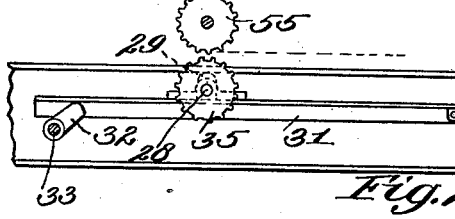
Witnesses:
Inventor
Stephen D. Murray

UNITED STATES PATENT OFFICE.

STEPHEN D. MURRAY, OF DALLAS, TEXAS.

BALING-PRESS.

1,074,642.  Specification of Letters Patent.  Patented Oct. 7, 1913.

Application filed February 10, 1911. Serial No. 607,794.

*To all whom it may concern:*

Be it known that I, STEPHEN D. MURRAY, a citizen of the United States, residing at Dallas, in the county of Dallas and State of Texas, have invented new and useful Improvements in Baling-Presses, of which the following is a specification.

This invention relates to baling presses particularly adapted for baling cotton, though capable of use in baling other materials or substances.

The primary object of the invention is the production of a baling press having a strong and durable organization of coöperating devices and mechanisms for feeding and pressing cotton into, and rendering the pressed cotton conveniently accessible for completing the bales in a plurality of boxes movable in alternation from one position to another.

A further object of the invention is to provide a baling press wherein strain injury to the several parts thereof is obviated through the medium of stable supporting means remaining temporarily fixed during the time the greatest pressure tension is imposed thereon and freely movable at intervals to change the position of the baling boxes relatively to coöperating instrumentalities for feeding the same and forming the bales therein by a downward pressure.

A still further object of the invention is to provide a baling box having sides or doors with lower shiftable attaching means operative to gradually open the sides or doors from their lower ends and relieve them of pressure stress and to conveniently open the box for access to the bale to complete the latter and also to effect a locking at the upper terminals of said sides or doors when the box is closed for the reception of material.

Other objects and advantages will be more fully hereinafter specified in conjunction with the description of the preferred structural features.

The invention essentially contemplates a supporting means or platform provided with a plurality of baling boxes and having a fixed position at intervals of pressure application on a stable base and elevatable and rotatable to dispose the boxes alternately in operative relation to feeding and pressing mechanism.

The invention further consists of a supporting means or platform having a plurality of baling boxes and provided with a lower elevatable fulcrum or pivot means operatively associated with a firm base on which the supporting means or platform has fixed engagement during the pressure strain exerted in the boxes on the cotton to form the bales to fully relieve the fulcrum or pivot means of strain.

The invention further consists of a baling box having doors with attaching means movably connected to the lower ends thereof and shiftable outwardly from and inwardly toward the box to gradually relieve the doors of pressure strain when opening the same to render a pressed quantity of cotton accessible for completion of the bale.

The invention further consists of a baling box having doors provided with means for gradually opening the same from their lower terminals to render the baling box accessible and closing said doors to lock the same in normal position.

The invention also consists in the construction, arrangement and combination of elements and devices which will be more fully hereinafter described in preferred form.

The drawings illustrate one preferred embodiment of the invention for the purpose of practically demonstrating the advantages and functions sought to be structurally protected, but the invention is not to be understood as being limited to the exact construction which will be hereinafter described, but capable of a wide range of modification within the scope of the invention as claimed.

Figure 6:
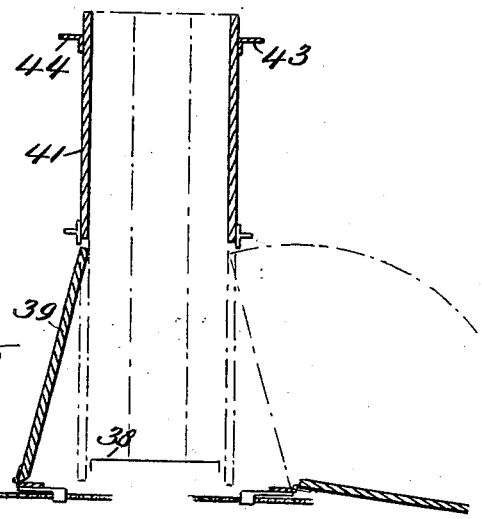
Figure 7:
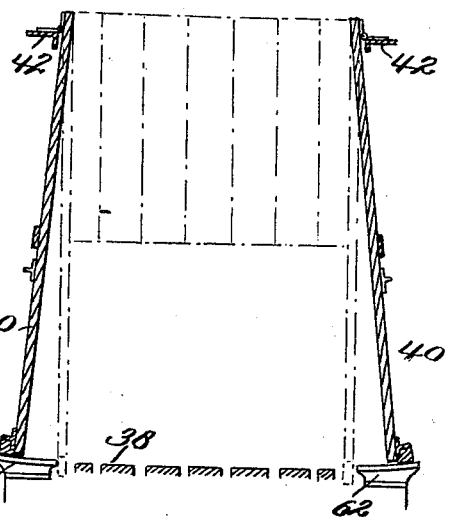
Figure 8:
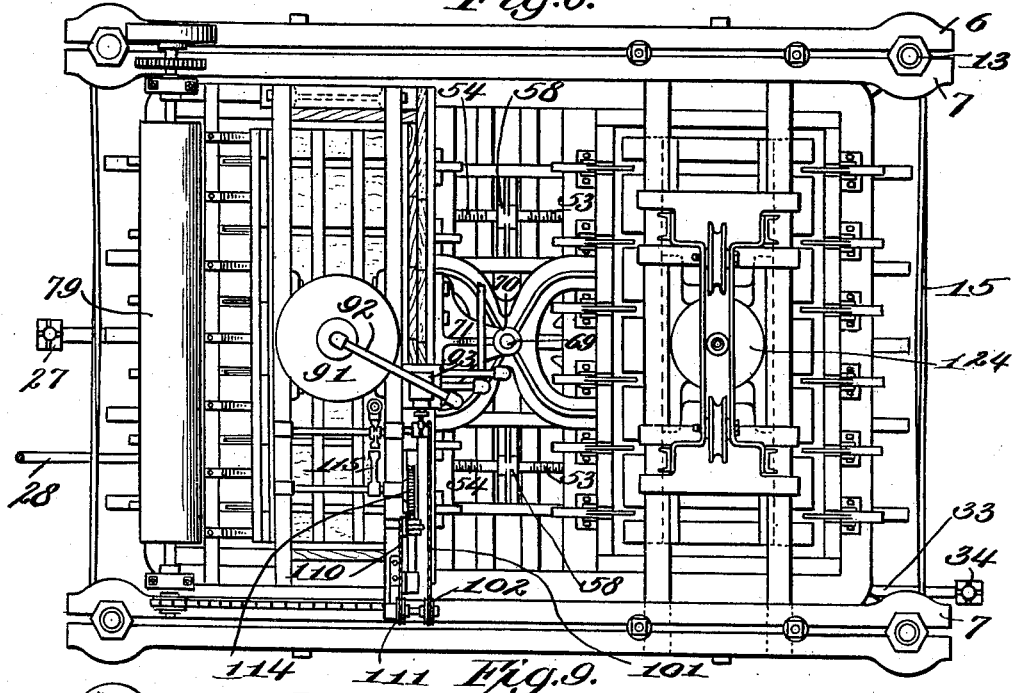
Figure 9:
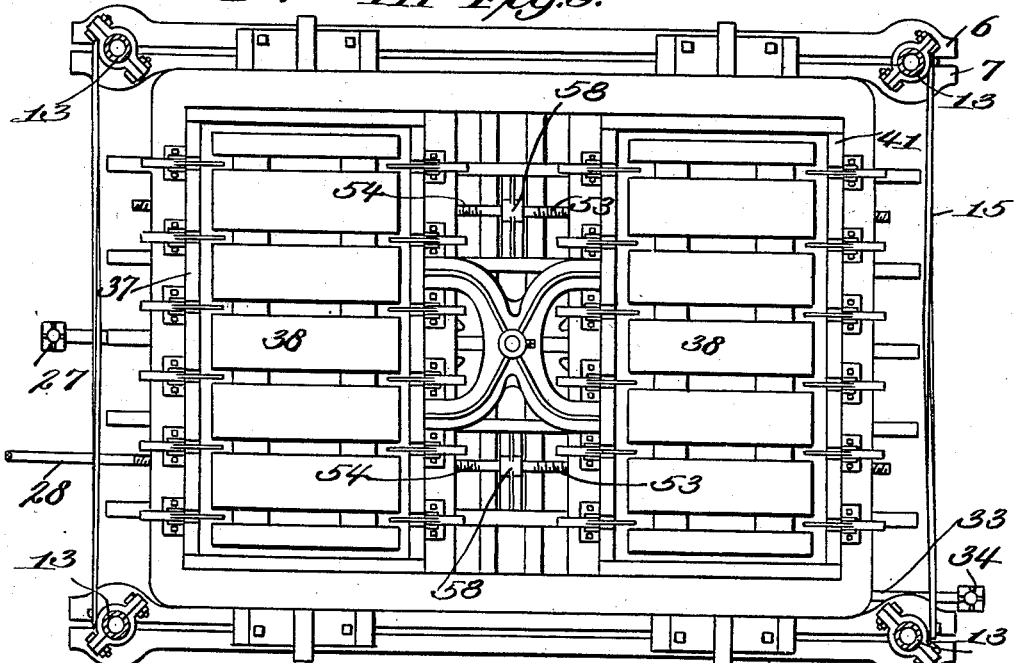

In the drawings: Figure 1 is a vertical section through the upper portion of a baling press embodying the features of the invention. Fig. 1$^a$ is a similar section of the remaining portion of the press and forming a continuation of Fig. 1. Fig. 2 is a vertical section through the receiving chamber and a portion of one of the bale boxes, and particularly illustrating the movable side wall of the chamber. Fig. 3 is an elevation of the press showing the supporting means or platform elevated from the base in rotatable position. Fig. 4 is a detail elevation of the cotton ram attachment including the counterbalancing weights therefor. Fig. 5 is an end elevation of the press. Fig. 6 is a detail view of one of the baling boxes mainly in vertical section and particularly illustrating the operation of the doors for rendering the pressed cotton accessible for completing the bale. Fig. 7 is a view similar to Fig. 6 looking toward the broad side of one of the baling boxes and showing the narrow sides thereof open or expanded. Fig. 8 is a top plan view of the improved press complete. Fig. 9 is a section taken in the horizontal plane of the line 9—9, Fig. 1ª. Fig. 10 is a horizontal section taken in the plane of the line 10—10, Fig. 1ª. Fig. 11 is a detail elevation of a portion of the press particularly illustrating the mechanism for controlling the application of the motive medium to the tramper organization. Fig. 12 is a sectional view of a valve used in controlling the application and exhaust of the motive medium for operating the tramper organization. Fig. 13 is a horizontal section taken in the plane of the line 13—13, Fig. 1ª. Fig. 14 is a detail perspective view showing the corner fastenings of the sustaining bars of one of the boxes. Fig. 15 is a horizontal section taken in the plane of the line 15—15, Fig. 1ª. Fig. 16 is a detail perspective view showing portions of the wide sides or doors and narrow side of the baling box and illustrating the coöperating fastening means at the corners. Fig. 17 is a detail perspective view showing a hinge or pivot means for the lower ends of the wide sides or doors of the baling boxes, the parts of the hinge or pivot means being shown separated. Fig. 18 illustrates in perspective details of the means for movably supporting the lower ends of the narrow sides of the baling boxes. Fig. 19 is a detail elevation of mechanism for throwing the power mechanism into engagement with the operating devices of wide sides or doors of the boxes. Fig. 20 is a detail sectional elevation showing the means for elevating the fulcrum or pivot means of the box supporting means or platform.

The numeral 5 designates the base of the press which may be of any preferred arrangement and material, but preferably composed of channel beams 6 and 7 arranged in contiguous pairs and connected by intermediate beams 8, 9 and 10, 11, and 12, the beam 8 acting to reinforce the base at the point where it is applied or where moderate stress occurs, the beams 9 and 10 acting as a supporting means for the fulcrum which will be hereinafter explained in addition to performing the function of connecting means for the pairs of channel beams 6 and 7, and the beams 11 and 12 acting to reinforce the base at a point where the maximum pressing stress must be resisted and also serving as holding means for mechanism which will be more fully hereinafter described.

It is obvious that the particular arrangement of the members or elements of the base as just explained may be modified at will and other parts added if found necessary, it being sufficient for the purposes of practical demonstration to state that the base 5 is constructed and arranged to serve as a stable support or sustaining means for the parts of the press disposed thereon. The channel beams 6 and 7 at their opposite extremities are shaped to receive the lower ends of uprights or posts 13, the opposite extremities of the channel beams being clamped around the lower extremities of the uprights or posts as at 14 to form a rigid assemblage of the uprights and the channel beams. The uprights or posts will extend above the base a distance sufficient to render them effective in the performance of their function or to solidify the frame structure, and to prevent racking or distortion of these uprights or posts they are provided with braces 15 connected to split collars 16 clamped to pairs of the uprights, as clearly shown by Fig. 5. On the beams 11 and 12 wood fillers 17 and 18 are respectively applied for convenience in structure or to permit the same to be readily cut for clearance of a movable part or parts which will be more fully hereinafter explained.

Disposed over and movable on the base 5 is an elevatable supporting means or platform 19 which may be of any preferred construction, but in the present instance is so organized as to accommodate the application thereto of the boxes and mechanisms which will be hereinafter disclosed. This supporting means or platform 19 might be structurally modified in a number of ways, and for the purposes of illustration a spider is shown secured to the under side of the center thereof, as at 20, the said spider being provided with a central socket 21 in which is fitted a casting 22 which is loose in relation to the socket and has a flange 23 normally resting on the upper edges of the beams 9 and 10, as clearly shown by Fig. 1ª. Within the casting 22 the center fulcrum of the supporting means or platform 19 is held and consists of a pin 24 having its lower end in engagement with an eccentric 25 of a shaft 26 for elevating the fulcrum means and the platform 19 above the base a sufficient distance to permit the said platform to rotate at intervals when it is desired to change the position of the boxes and their coöperating devices relatively to the feeding and pressing means. The shaft 26 has its inner extremity provided with the eccentric 25 bearing in the beams 9 and 10 and also in the lower extremity of the casting 22, the said shaft being also intermediately supported by the beam 8 and having on its outer end a suitable operating lever or hand bar 27. In the beam 11 at a suitable distance below the upper edge thereof the inner extremity of a power transmitting shaft 28 is movably mounted, a slot 29 being formed in the beam to receive the inner end of said shaft. This shaft 28 extends outwardly through the base 5 at the same side through which the shaft 26 projects and will be provided with suitable driving means and also with devices for reversing the movement thereof. The inner end of the shaft 28 has bearing in a box 30 secured on a transversely extending angle iron lever 31 fulcrumed at one end to a portion of the beam 11 and at its opposite extremity loosely engaged by a crank arm 32 of a crank shaft 33 which projects outwardly through one side of the base or the side opposite that through which the shafts 26 and 28 extend and is terminally provided with an operating lever or hand bar 34. By depressing the lever or hand bar 34 the crank shaft 33 and its crank arm 32 will operate to raise the extremity of the angle iron lever 31 and the box 30 and inner end of the shaft 28, the shaft being of considerable length and free to have said movement without disorganizing the operating devices therefor. The crank shaft 33 is steadied in its operation by the beam 12 through which it extends and has bearing at its inner end in the lower portion of the beam 11. On the inner end of the shaft 28 a pinion 35 is fixed to rotate therewith, the said pinion serving to transmit motion of the shaft 28 to mechanisms which will be presently explained in connection with the baling boxes.

Mounted on the platform or supporting means 19 and rotatable therewith are baling boxes 36 and 37 which are counterparts in construction and only one of the same will be specifically described. The bottom platen 38 of each box is fixed to the platform or supporting means 19 and is preferably arranged as shown by Fig. 1a. Each baling box comprises a pair of wide sides or doors 39 and a pair of narrower sides 40. The wide sides or doors 39 are adapted to be opened and closed and when closed extend upwardly about midway of the box and cooperate with fixed wide sides or side members 41 above the same. The narrower sides 40 are also movable outwardly from and inwardly toward the remaining sides and are continuous or unbroken throughout the full height of the box and pivotally attached at their upper ends to battens 42 which extend fully across from one box to the other, as clearly shown by Fig. 3, and intersected by other battens engaging or applied to the upper portions of the fixed wider sides 41, as at 43 and 44. These battens 42, 43 and 44 are preferably formed of angle iron and serve as supporting means for parts which will be presently explained, and the upper extremities of the narrower sides 40 are disposed inside of the battens 42. The lower ends of the fixed wider sides 41 have battens 45 secured thereto and as shown have depending flange members 46 inside of which the upper ends of the doors 39 are adapted to be moved to lock the said doors at these points when closed. Over the upper portions of the doors 39 strengthening and connecting battens 47 are applied, and at their lower ends said doors are pivotally connected by preferred means, as shown in detail by Fig. 17, and consisting in each instance of two members, one a leaf 48 with a knuckle 49 and the other a substantially rectangular sleeve 50 with knuckles 51 between which the knuckle 49 of the leaf 48 is pivotally held or movably disposed and connected by a suitable pintle.

All of the pivotal devices or hinges embrace and are secured to a cross-bar 52 to give them rigidity and practically constitute the pivotal means or hinges as one connecting instrumentality. Disposed under each baling box and carried by the platform or supporting means 19 are oppositely extending door actuating rods 52a having right and left hand screw-threads 53 and 54 and so constructed that the threads 53 will operate the parts with which they coact faster than the threads 54 actuate corresponding parts. The rods 52a are arranged in pairs under each box and one receives motion through the medium of a pinion 55 with which the pinion 35 on the shaft 28 is adapted to mesh, the motion transmitted to the pinion 55 being in turn imparted to the remaining rod by a sprocket wheel 56 engaged by a chain or link belt 57, the sprocket wheel 56 being operatively associated with the rods, as clearly shown by Fig. 10. The screw-rods of each baling box have motion imparted thereto from the shaft 28 precisely in the same manner and as hereinbefore particularly explained. The inner ends of the rods engage an intermediate bearing 58 and have abutting relation. The screw-rods are also supported by hangers 59 which, as shown, depend from the bottom platens 38 of the boxes 36 and 37. The threads 53 and 54 are engaged by nuts 60, the nuts engaging the threads 53 having plate extensions 61 secured to the bars 52, and the nuts engaging the threads 54 having reversely disposed plate extensions 61 similar to those over the threads 53 and likewise secured to the bars 52 for the hinges of the outer doors 39 of the boxes. From the foregoing description of the screw-rods it will be understood that when motion is transmitted to the pinion 55 from the pinion 35 the lower extremities of the doors 39 will be gradually moved away from the adjacent portions of the baling boxes until sufficient clearance is obtained for providing convenient access to the boxes to complete the bales or to tie the latter in the usual manner.

The lower ends of the narrower sides 40 of the baling boxes are arranged to move on segmental guides 62, as shown in detail by Fig. 18, the upper surface of each guide engaged by the lower end of the side 40 having a curvature corresponding to the arcuate movement of the said side, and attached to the lower end of each side 40 is a slotted guide 63 which movably embraces the segmental guide 62, or it may be considered that the parts 62 and 63 constitute as a whole a guiding means for the lower end of each side 40. The sides 40 serve as props for the baling boxes particularly when the sides or doors 39 are open, and when the said doors 39 are released and opened the sides 40 are free for outward movement and such movement will ensue in view of the outward pressure imposed thereon by the bale, or the said sides 40 may be manually moved, either to open the same or close them after the bale has been completed. The sides 40 are held closed or in normal position by hooks 64 at the ends of the battens 47 which take over and bear against the opposite terminals of battens 65 on the sides 40, as shown particularly in detail by Fig. 16. The battens 47 and 65 are applied in duplicate to the lower portions of the doors 39 and sides 40 to insure a positive retention of the said sides in normal position to resist internal pressure when the doors 39 are closed and locked. The upper ends of the sides 40 when the latter are opened do not move outwardly from the position which they occupy when closed and are therefore particularly effective in serving their function as props. The intermediate portions of the said sides 40 are limited in their outward movement and consequently at their lower ends by engaging tie straps 66 connecting the terminals of the battens 45. When the lower extremities of the doors 39 are moved outwardly from the baling box through the actuation of the screws 53 and 54 and nuts 60, their upper ends are gradually drawn downwardly to clear the flanges 46 of the battens 45, and under these conditions the lower extremities of said doors will have been moved outwardly from the baling box far enough to be entirely relieved of any internal pressure thereon and the outer doors 39 may be lowered manually to clear the adjacent side of the bale and likewise the inner doors 39 will have been moved far enough over by the more rapid operation of the screws 53 to clear the inner side of the bale and render the latter readily accessible for completion. It will be seen that between the inner portions of the bale boxes the platform is clear for the unobstructed operation of the doors 39, there being no posts or analogous devices projecting upwardly between the baling boxes. When the bale has been tied and removed from the baling box, a reverse motion is imparted to shaft 28 and as a consequence a similar reverse motion or actuation is given to the screws 53 and 54 and the doors 39 are moved inwardly, it being understood that the sides 40 will have been first closed manually so that the edges thereof will be in normal position for engagement by and locking association with the adjacent edges of the doors 39. After each box is closed the pinion 35 will be thrown out of mesh with relation to the pinion 55 so as to prepare for the rotation of the platform or supporting means 19.

On the projecting flanges of the battens 44 secured to the inner portions of the fixed wide side members 41, the terminals of the arms of a spider 67 are attached, said spider having a central socket 68 in which an upper fulcrum or pivot pin 69 is held and extends upwardly and slidably moves in a socket 70 of a bracket 71 fast to the lower portion of the inner side of a receiving chamber 72. The spider 67 in view of the particular manner of securing the same as just explained, operates to prevent racking or distortion of the upper portions of the baling boxes and together with the battens 42 extending from one baling box to the other produces a strong and durable as well as highly efficient organization at the upper portions of the said boxes. The boxes at their upper portions are also prevented from having the least lateral movement and always remain in true position relatively to each other and with the mechanisms with which they are adapted to coöperate. The two pivots 24 and 69 coöperate with their respective engaging parts in providing for an easy swinging or rotatable movement of the platform or supporting means 19 and the baling boxes, and to give clearance during the rotatable movement to the platform with respect to portions of the base and particularly to the parts that may project into the base, the filling blocks 17 and 18 are cut away or recessed as at 73 and 74 respectively, as clearly shown by Fig. 10.

The receiving chamber 72 is held in fixed position by attaching the same to the two adjacent uprights 13 by means of brackets 75 connected to channel beams 76 extending from the upper ends of one pair of uprights to the similar ends of the opposite pair of uprights. The brackets 75 or the attaching means for the upper portion of the receiving chamber act to suspend the latter, and at its lower extremity said chamber has a batten 77 surrounding the same and to a portion of which clamping collars 78 are secured and also engage the uprights 13 to prevent lateral movement of the lower extremity of the receiving chamber, as clearly shown by Fig. 1ª. The receiving chamber is provided with a pair of feeding rolls 79 and 80, the lower roll 80 being positively driven from a suitable power source and by any preferred means, the upper roll 79 being driven from the lower roll by interposed gears adapted for the purpose. As will be understood, the rolls 79 and 80 are held in movable association by suitable resilient means, as at 81, Fig. 3, to permit the material to pass between the same by springing the rollers apart. The outer side of the receiving chamber, as at 82, is movable to compensate for an excessive accumulation of material therein at a time when the means for clearing the said chamber of material fed thereto is not in operation, the said movable side under these conditions being forced outwardly and actuating a signal of such character that an operator will be immediately notified that it is necessary to throw into action the means for clearing the chamber of the accumulated material. The side 82 is movably attached or hinged at its lower extremity to a portion of the batten 77 as at 83 and is limited in its outward movement at the upper extremity thereof by a cross-bar 84 attached to the batten 85 to which the brackets 75 are secured, a spring 86 being interposed between the upper portion of the side 82 and the bar 84, as shown by Fig. 1, to restore the said side to normal position when relieved of internal pressure. The signal as shown for the purposes of illustration in the present instance, consists of a bell 87 mounted adjacent to the upper end of the side 82 and provided with suitable striking means operable by a pull-rod 88 attached thereto and to the side 82. Many devices could be adopted for giving a signal by the outward movement of the side 82 of either an audible or a visual nature, and the simplified form of signal illustrated is to be considered as only one practicable means of arriving at the result sought.

Disposed over and in operative relation to the receiving chamber is a tramping organization essentially embodying a platen 89 attached to the piston 90 of a fluid pressure cylinder 91 provided with well known means for supplying opposite extremities thereof with the fluid pressure medium or steam, said means being generally designated by the reference character 92 and including a valve 93 and a tappet rod 94 arranged to perform their usual functions. The valve 93 may be of any preferred type or of the form shown in detail section by Fig. 12 and having a suitable slide or cut-off 95 provided with an actuating rod 96 movably attached to the lower end of a lever 97 intermediately fulcrumed as at 98 and having opposite tappet arms 99 and 100. To the upper end of the lever 97 a pull-cord or analogous device 101 is attached and passed over a guide sheave 102 supported by a suitable bracket 103 and depends within easy reaching distance of an operator.

Mounted on one of the channel beams 76 in suitable bearings 104 is a power transmitting shaft 105 having driving means on its outer end, such as a sprocket wheel and chain belt 106, operated from a suitable power source or from mechanism used in driving the remaining parts of the press. Loose on the shaft 105 is a worm 107 having a suitable clutch end with which a clutch collar 108 splined on the shaft is adapted to coöperate to cause the said worm to rotate with the shaft. The collar 108 is shifted on the shaft 105 by a clutch lever 109 having a pull-cord or analogous device 110 attached to the upper end thereof and passing over a guide sheave 111 also supported by the bracket 103 and depending within reaching distance of an operator and adapted to be held in downwardly pulled condition by engagement with a fork 112 on a convenient portion of the frame of the press to maintain the clutch collar 108 in engagement with the worm 107. The clutch lever 109 is moved by the cord 110 against the resistance of a spring 113 attached thereto and to an adjacent fixed support, the said spring when cord 110 is released operating to restore the lever 109 and the clutch collar 108 to normal position or to disengage the said collar from the worm 107. Mounted adjacent to the shaft 105 and continually meshing with the worm 107 is a worm wheel 114 provided with a tappet arm 115 which regularly rotates therewith and adapted to engage the arm 100 when the latter is elevated, as shown by Fig. 11. The tappet rod 94 and the tappet arm 115 operate through contact with the arms 99 and 100 respectively to automatically throw the lever 97 into operative position and accordingly modify the operation of the valve 93 by shifting the slide 95 through the medium of the rod 96 attached to the lower end of the lever 97 to regulate the ingress and exhaust of the fluid pressure medium relatively to the opposite extremities of the cylinder 91 to alternately reciprocate the piston 90 and the platen 89 of the tramper mechanism in opposite directions.

The platen 89 of the tramper is of materially less dimensions than the interior of the receiving chamber and baling box so that an unobstructed open space, as at 116, is formed in the receiving chamber between a side portion of the platen and the movable side or wall 82 directly below the rolls 79 and 80, and this space continues at least fully through to the bottom of the said receiving chamber. This space 116 is provided in the receiving chamber to permit feed of the cotton or other material into the receiving chamber regardless of the operation of the platen and without requiring cessation of operation of the feeding means or the rolls 79 and 80. In other words, when the press is regularly operated and the platen is depressing and elevating in the receiving chamber the feed of the cotton or other material into said chamber proceeds continuously, and it will be understood in this connection that the time of downward and upward movement of the platen is very much less than the interval of time that the platen remains at the upper portion of the chamber during filling of the latter with cotton or other material. The platen is provided with the usual shield or partition 117 movable therewith downwardly into the receiving chamber to prevent the cotton or other material from falling over upon the platen, and when said shield or partition is in the receiving chamber it forms an inner wall for the receiving space 116 which always remains clear or unobstructed.

An improved feature of the platen in the present instance is the addition thereto of means for pushing the cotton or other material that may gather in the space 116 in a downward direction, said means being movable inwardly on the upstroke of the platen to freely pass the cotton or other material in the space 116 without dragging or pulling the cotton upwardly toward the top of the receiving chamber. This means consists of a plurality of dogs 118 gravitatingly supported or pivoted on the lower portion of the shield or partition 117 and so disposed with regard to preponderance of weight thereof that they will be projected through slots 119 in the shield. These dogs 118 are connected for simultaneous movement or unity of action by a rod 120 extending through inner portions thereof and also serving as a weight means or adding to the counterpoise weight of the said dogs. The dogs 118 are also provided with projections 121 which serve as stops adapted to bear against the inner portion of the lower extremity of the shield or partition to prevent the said dogs from having upward movement and also for maintaining the said dogs in a predetermined maximum projected condition so as to clear the side or wall 82 when moving downwardly adjacent to the latter. It will be understood that the dogs 118 freely move into the space over the platen 89 through the slots 119 when pressure is brought to bear on the upper downwardly inclined edges thereof, but resist pressure and fail to move in the least when the lower edges thereof come in contact with cotton or other material in the space 116, and under these conditions when the said dogs are moving downwardly with the platen 89 they operate to push the cotton or material in the space 116 ahead of the same into the baling box. While these dogs 118 are very effective auxiliaries in the operation of the platen to clear the space 116 of accumulated cotton or other material, it will be understood that the platen may be operated to perform the same function of clearing the said space without the dogs by pressure on the mass of cotton in the receiving chamber and a coherence with the said mass of cotton that may have been deposited in the space 116 while the platen and shield 117 are down. The boxes 36 and 37 are also provided at their upper portions with the usual gravitating retaining dogs 122 performing the well known function of holding the cotton that is tramped downwardly into the boxes below the said dogs 122 against upward movement.

While the shaft 105 provided at its outer extremity with the sprocket wheel and chain belt 106 might be operated from any suitable power source or power transmission means, it is preferred that the said chain belt engage a sprocket wheel 123 fixed on the spindle or shaft of the lower feed roll 80.

Supported by and between the upper channel beams 76 at a predetermined distance from the receiving chamber 72 is a hydraulic ram 124 embodying the usual organization of devices of this class and including a platen 125 and counterpoise weights 126 having the well known function. This hydraulic ram is disposed, as clearly shown by Fig. 3, to exert the final or bale forming pressure in the boxes 36 and 37 when the latter are alternately swung around under the platen 125. The pressure of the ram in this instance is exerted downwardly from the top portion of each bale box, as clearly indicated by Fig. 3, and by this means the bales when completed may be readily removed from the lower portions of the boxes. Furthermore, by disposing the ram in the position as just explained and causing the same to exert a downward pressure relatively to the boxes, it is obviously unnecessary to sink a shaft in the ground under the press for the instalment of the ram as commonly practiced in the erection of baling presses where the ram exerts an upward pressure relatively to the baling boxes. It will be seen that the ram pressure is exerted in the boxes when the latter are disposed over that portion of the base 6 having the beams 11 and 12 therein so as to set up the greatest resistance at the point of maximum pressure on the boxes with material advantages in durability as well as effectiveness in the operation of the press.

From the foregoing it will be understood that the platform or supporting means 19 has the boxes 36 and 37 arranged thereon in such manner that while one box is under the receiving chamber the other box is disposed under the ram, and hence while one box is being filled with cotton or other material and the latter is tramped, the previously filled box is having the bale completed therein by the operation of the ram which fully presses the cotton downwardly into the lower portion of the box thereunder against the fixed bottom platen 38 and below the upper terminals of the doors 39. When the bale shall have been fully compressed within the box under the ram an operator immediately actuates the crank shaft 33 to raise or elevate the inner extremity of the shaft 28 to throw the pinion 35 into mesh with the pinion 55, thereby actuating the screws 53 and 54 disposed to coöperate with the doors 39 of the box in which the bale is being formed and immediately the lower ends of the doors 39 are moved away from the lower portion of the bale box and the upper ends of said doors drawn downwardly and cleared from their locking means and after a certain movement of the doors 39 sufficient to clear the holding means carried thereby, as hereinbefore explained, from the lower portions of the sides 40, the said sides are also moved outwardly by the pressure from within the box, as shown by Fig. 7, and the outermost door 39 may be easily fully opened without jar or injury thereto and the innermost door if desired may be moved over against the adjacent portion of the remaining box then under the receiving chamber. When the doors 39 are so disposed the bale will be readily accessible for tying, and after it is completed and removed from the box the sides 40 are manually pushed inwardly into normal position and the rotation of the shaft 28 by means of suitable mechanism on the outer extremity thereof is reversed and the pinions 35 and 55 as well as the screws 53 and 54 are given a like reversal of movement to move the lower extremities of the doors inwardly toward the box or the edges of the closed sides 40, it being understood that the outermost doors 39 will have been first elevated so as to be in position for automatically locking the upper end thereof in conjunction with the upper end of the remaining door and which locking operation ensues relatively to both doors 39 by reason of the gradual upward movement of the upper ends thereof inside of the flanges 46 or analogous means as the lower ends of these doors are drawn into normal position relatively to the box and at the same time the sides 40 are locked by the devices on the doors 39, as illustrated in detail by Fig. 16 and hereinbefore fully described. When the baling box which has just been relieved of its bale is fully closed to receive a further supply or charge of cotton or other material, the shaft 28 is lowered to disengage the pinion 35 from the pinion 55 and at this time the box 37 which has been undergoing a filling operation will have received its full charge, and the operator will then actuate the crank shaft 26 through the medium of the lever or hand-bar 27 to raise the platform or supporting means 19 and clear the base so that the platform may be rotated to bring the empty box under the receiving chamber 72 and the filled box under the platen 125 of the ram 124 when the same operation of final compression and completion of the bale will ensue. In the operation of filling the boxes it will be understod that preliminarily the cotton is permitted to pass into and through the receiving chamber from the rolls 79 and 80 and downwardly into the box under the receiving chamber until the box and chamber are completely filled, and during this time the tramper mechanism is in a state of rest.

In the event that an excessive amount of cotton accumulates in the receiving chamber, pressure is exerted thereby on the side or wall 82 and the latter is moved outwardly and actuates the signal 87 and thereupon the operator thus notified will promptly pull downwardly on the cord or analogous device 101 and operate the valve 93 through the slide 95 to cause the fluid pressure medium to enter the top of the cylinder 91 and force the piston 90 and tramper platen 89 downwardly through the receiving chamber into the baling box to relieve the said chamber of the cotton accumulated therein and deliver the same into the box below the dogs 122. Immediately subsequent to this operation the operator will set the tramper mechanism for continuous action in an automatic manner by forcing the clutch collar 108 on the shaft 105 into engagement with the worm 107 and thereby operating the worm wheel 114 and causing a rotation of the arm 115 around the axis of said wheel, said arm intermittently engaging the tappet arm 100 and causing the fluid pressure medium to flow into the top of the cylinder 91, and the upper terminal of the tappet rod 94 engaging the tappet arm 99 when the tramper platen 89 shall have reached the lower limit of its stroke and promptly shutting off the flow of the fluid pressure medium to the top of the cylinder 91 and exhausting the cylinder above the piston therein and opening the lower portion of the cylinder to the fluid pressure medium to effect an immediate upstroke of the piston 90 and tramper platen 89. During the automatic actuation or reciprocation of the tramper platen 89 and coöperating devices there will be intervals of rest of the platen owing to the rotation of the arm 115 of the worm wheel 114, the duration of these intervals being equal to the length of time required for the said arm 115 to make one complete revolution, and at such intervals of rest the platen will remain at the upper portion of the receiving chamber 72 while the cotton is filling in or being fed into the said chamber beneath the platen.

When the box under the receiving chamber has been sufficiently charged with cotton the clutch collar 108 will be released from the worm 107 and the tramper controlling mechanism will be caused to cease its tramping operation until the empty box or that which has been relieved of a completed bale is swung around under the receiving chamber. The successive operations of charging the boxes with cotton and finally pressing the bales therein may be expeditiously effected, and during the period of turning the boxes a slight pause in the operation of the gins is effected by any of the known methods. The cotton passes from the ginning organization to the feed rolls 79 and 80 by means of an inclined chute 127, as shown by Fig. 3, but other means may be adopted for this purpose.

It will be understood that any suitable well known means will be employed for controlling the operation of the ram and, furthermore, that the usual methods of completing a bale in the boxes will be pursued. It will also be observed that sufficient space is left between the upper terminals of the baling boxes and the lower terminal of the receiving chamber 72, and also between the upper end of the socket 68 of the spider 67 and the lower terminal of the socket 70 of the bracket 71 to compensate for the elevation of the platform or supporting means 19 and the boxes thereon for the purpose of rotating said platform and boxes.

Though a preferred structure of the invention has been shown and described, it will be understood that changes in the proportions, dimensions and minor details may be resorted to without departing from the spirit of the invention, and as hereinbefore indicated the boxes with the means for automatically opening the doors and effecting a locking action of the narrow sides by said doors present a structural organization and advantageous operation which may be adopted in any other form of press or be used independently of the rotating or swinging platform. It will also be understood that the particular form of receiving chamber and the provision of a clear space in the latter for the reception of cotton or material to be pressed continuously while the cotton or material is being fed thereto regardless of the actuation of the tramper mechanism may also be used in conjunction with any other form of baling boxes or supporting means for the boxes. A further important advantage of the improved structure is that the doors 39 may be gradually relaxed with relation to the bale to permit a relief of pressure at the sides of the bale and at the same time maintain the shape and position of the bale for the purpose of more expeditiously imposing on the bale the final pressure effect of the ram to obtain the ultimate maximum density of the bale.

What is claimed as new is:

1. In a baling press, a fixed base, and an elevatable and rotatable supporting means disposed on the base and carrying a plurality of baling boxes, with a fully open space between their inner opposing portions, the said boxes directly resting upon and held by the said supporting means.

2. In a baling press, a fixed base, an elevatable and rotatable supporting means disposed on the base and carrying a plurality of baling boxes, the boxes resting directly upon and supported at their extremities by said means, and cotton supplying and pressing mechanism for coöperation with the boxes, the boxes being pivotally held solely at their upper and lower portions and having a clear space between their inner opposing sides.

3. In a baling press, a base, an elevatable and rotatable supporting means disposed on the base and carrying a plurality of baling boxes with an unobstructed space between their inner opposing sides, and cotton supplying and pressing means alternately coöperating with the boxes, the said boxes directly resting upon and held by the said supporting means.

4. A baling press embodying an elevatable and rotatable plurality of baling boxes having the pivotal means therefor located solely adjacent to the upper and lower portions thereof, means for effecting the elevation and rotation of said boxes and on which the lower extremities of the boxes directly rest, and means for supplying and pressing material in the boxes.

5. A baling press embodying a plurality of elevatable and rotatable baling boxes having the pivotal means therefor located solely adjacent to the upper and lower portions thereof, a fixed base on which the boxes directly rest and operate, and pressing means alternately operating with the boxes, the boxes during the maximum pressure imposed therein being held positively on the base to remove any strain from the means for elevating and rotating the same.

6. In a baling press, a fixed base, a supporting means provided with devices in part engaging the base for effecting an elevation and rotation of the said means, a plurality of baling boxes directly bearing at their lower extremities upon and fixed on said supporting means, the baling boxes also having upper pivotal supporting means and the space between the inner opposing sides of the boxes being clear for free passage therebetween, and means for forming a bale in each box.

7. In a baling press, a fixed base, a supporting means provided with devices in part engaging the base for effecting an elevation and rotation of the said means, a plurality of baling boxes directly bearing at their lower extremities upon and fixed on said supporting means, the baling boxes also having upper pivotal supporting means and the space between the inner opposing sides of the boxes being clear for free passage therebetween, and pressing means alternately operating with the boxes and exerting a downward pressure in the latter.

8. In a baling press, a fixed base, a plurality of rotatable baling boxes having their lower extremities directly disposed on and supported by the base and having intervals of rest in relation to the latter, the baling boxes being provided with fixed bottoms, the boxes also having upper pivotal means and the space between the inner sides thereof being entirely clear and free for passage therethrough, and pressure mechanism coöperating with the boxes and exerting a downward pressure in the latter against the material supported by said fixed bottoms.

9. In a baling press, a plurality of rotatable boxes, a receiving chamber with which said boxes alternately coöperate, a tramper mechanism coöperating with the receiving chamber and the box thereunder, the tramper platen being of less dimensions than said chamber and located nearer one side of the latter than the other so that a space is formed between the platen and one side of the chamber to permit a continuous feed of the material into said space, and means for feeding material to said chamber.

10. In a baling press, a baling box, a receiving chamber under which said box is movably disposed, a tramper mechanism coöperating with the receiving chamber and box, the tramper platen being of less dimensions than said chamber and located nearer one side of the latter than the other so that a space is formed between one side of the chamber and the platen to permit a continuous feed of the material into the chamber regardless of the operation of the tramper mechanism, and means for continuously feeding material to the chamber during the time that the box is thereunder.

11. In a baling press, a receiving chamber, a tramper mechanism coöperating with and movable in the receiving chamber and having a platen of less dimensions than the chamber to provide a space between one side portion of the platen and one side of the chamber for continuously receiving material fed into the chamber, means for feeding the chamber with material, and means movably disposed under the chamber to receive the material therefrom.

12. In a baling press, a receiving chamber for a baling box, a tramper mechanism coöperating with the chamber and box, the tramper platen being of less dimensions than said chamber and located nearer one side of the latter than the other so that a space is provided between the said platen and one side of the chamber to permit a continuous feed of material into said space, and means for feeding material to said chamber.

13. In a baling press, a receiving chamber having an upper movable side portion hinged at its lower extremity, a signal means connected to and actuated by said side when the latter is moved by material in the chamber, and means for relieving the chamber of the material therein.

14. In a baling press, a receiving chamber for a baling box, a tramping mechanism arranged to coöperate with and move in the chamber and including a platen with a fixed shield, the platen being of less dimensions than the interior of the chamber so that a space is formed between the platen and shield when the latter are in the chamber and one side of said chamber, means for feeding the chamber with material, and means for receiving the material from the chamber.

15. In a baling press, a receiving chamber for a baling box, a tramper mechanism coöperating with and movable in the receiving chamber and provided with a plurality of dogs pivotally mounted and having a gravitating movement, the dogs moving into a portion of the platen of the tramper mechanism on the upward stroke of the latter and having a fixed outward projection on the downward stroke of the same, the platen being of less dimensions than the interior of the chamber so that a space is formed between the portion of the tramper mechanism carrying the dogs and one side of the chamber to continuously receive material when the tramper mechanism is in the chamber, and means for feeding the chamber with material.

16. In a baling press, means for receiving cotton for the purpose of forming a bale, combined with a tramper mechanism movable in the said means and of less dimensions than the latter to form a space between a portion of said tramper mechanism and one side of said means, and devices for feeding material into said means and continuously into the said space during the required supply of the material.

17. In a baling press, means for receiving cotton for the purpose of forming a bale, combined with a tramper mechanism having movement through a portion of said means and provided with a device for walling off a part of said means to continuously receive material fed into the means while the tramper mechanism is in the latter, and devices for feeding material into said receiving means.

18. In a baling press, means for receiving cotton for the purpose of forming a bale, combined with a tramper mechanism including a platen and a partition device movable therewith in the receiving means for walling off a part of the latter to continuously receive material fed into said means regardless of the operation of the tramper mechanism, and devices for feeding material into said receiving means.

19. A baling press having a receiving chamber for material, tramper means movable in the chamber for relieving the latter of material deposited therein, said means embodying a platen of less dimensions than the interior of the chamber and forming with the latter a temporary auxiliary chamber in which material is continuously fed during the operation of said means, and feed mechanism for depositing material in said receiving chamber and auxiliary chamber.

20. A baling press having a receiving chamber, and tramper means having a platen of less dimensions than the interior of the chamber and temporarily forming an auxiliary chamber therein.

21. A baling press having a receiving chamber, and tramper means having a platen of less dimensions than the interior of the chamber and forming an auxiliary chamber therein at intervals.

22. A baling press having a baling box provided with doors movable outwardly and inwardly at their lower extremities, and mechanism for operating the doors.

23. A baling press having a baling box provided with doors movable outwardly and inwardly at their lower extremities, and manually controlled mechanism for opening and closing said doors.

24. A baling press having a baling box provided with doors having self-releasing and locking operations, and mechanism for actuating the doors.

25. In a baling press, a baling box provided with doors pivotally attached and movable at their lower ends away from and toward the box.

26. In a baling press, a baling box provided with doors pivotally secured and movable at their lower ends away from and toward the box, and mechanism for operating the doors.

27. A baling press having a baling box with doors pivoted at their lower ends and movable away from and toward the box, the doors being automatically released and locked.

28. In a baling press, a baling box provided with opening and closing doors, and mechanism for operating the doors at differential rates of movement.

29. In a baling press, a baling box provided with opening and closing doors, and side members pivoted at their upper ends and having their lower ends free to open when released.

30. In a baling press, a baling box provided with opening and closing doors, and side members movably attached at their upper ends, the doors having means to lock the members when closed and to release the members when said doors move to open position.

31. In a baling press, a baling box with wide sides having doors pivoted at their lower ends, and narrow sides pivoted at their upper ends, the doors and narrow sides being movable at their lower ends away from and toward the box.

32. In a baling press, a baling box having wide sides with doors shiftably pivoted at their lower ends and free for automatic disengagement at their upper ends, and narrow sides pivoted at their upper ends and free for automatic disengagement at their lower ends, and means carried by the doors and operable therewith to release and lock the narrow sides.

33. In a baling press, a baling box having the pairs of its opposing side members pivoted thereto at reverse extremities, the one pair of members pivoted at their lower extremities having said extremities movable away from and toward the box and their upper extremities free for disengagement from the box, and the remaining pair of members pivoted at their upper extremities and free to move at their lower extremities away from and toward the box.

34. In a baling press, a baling box with wide sides having lower doors shiftably pivoted at their lower ends, and narrow sides extending full height of the box and pivoted at their upper ends, the doors and narrow sides being movable away from and toward the box, and the narrow sides serving as props for the box.

35. In a baling press, a baling box having pivotally attached doors movable at their pivoted ends away from and toward the box.

36. In a baling press, a baling box provided with doors having pivoted ends, and means coöperating with the pivoted ends of the doors for moving said ends away from and toward the box.

37. In a baling press, a baling box provided with doors having end pivot devices, and screw rods engaging said end pivot devices for moving the adjacent ends of the doors away from and toward the box.

38. In a baling press, a baling box provided with doors at opposite sides having end pivot devices, and screw rods having reversely screw-threaded portions engaging the pivot devices of the opposing doors.

39. In a baling press, a base, and a baling box supported solely at its lower extremity by the base, the box being provided with doors at its lower end and wholly free of supporting means above the doors.

40. In a baling press, baling boxes having side walls arranged as supporting legs for the boxes and also acting as doors to give access to the bales in the boxes.

41. A baling press having a plurality of baling boxes, each of which has two of its side walls acting as supporting legs for the box and also as doors to permit access to the bale in the box.

42. A baling press having baling boxes each of which has certain of its walls arranged to act as supporting legs for the box, the said walls being pivotally attached at their upper extremities and having swinging movement at their lower extremities.

43. A baling press having baling boxes each of which has certain of its walls operative to act as supporting legs for the box, the said walls being pivotally attached at their upper extremities and having a swinging movement at their lower extremities.

44. In a baling press, a fixed base, an elevatable and rotatable means disposed on the base, and a plurality of baling boxes carried by the base, said boxes having two opposite walls arranged as supporting legs for the boxes and as doors for access to the bales when formed.

45. In a baling press, a support, and a plurality of baling boxes, said boxes having two opposite walls with lower extremities disposed to rest upon the said support in the manner of and acting as supporting legs for the boxes, the said walls being also operative to serve as doors for access to the interior of each box and permit the removal of a bale when formed therein.

In testimony whereof I have hereunto set my hand in presence of two subscribing witnesses.

STEPHEN D. MURRAY.

Witnesses:
  S. E. GILLESPIE,
  THEODORE LIEBISCH.

---

Copies of this patent may be obtained for five cents each, by addressing the "Commissioner of Patents, Washington, D. C."